C. SCHEELK.
VALVE GASKET.
APPLICATION FILED FEB. 21, 1911.
1,033,201.
Patented July 23, 1912.
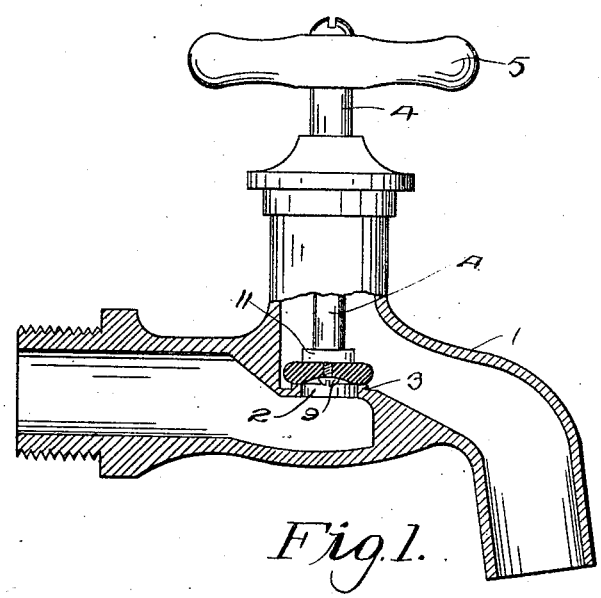
Fig. 1.
Fig. 2.
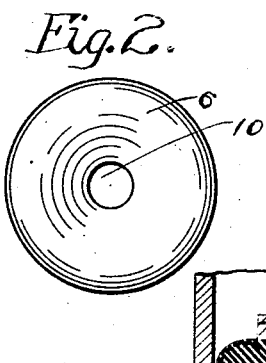
Fig. 3.
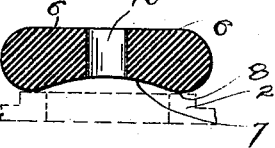
Fig. 4.
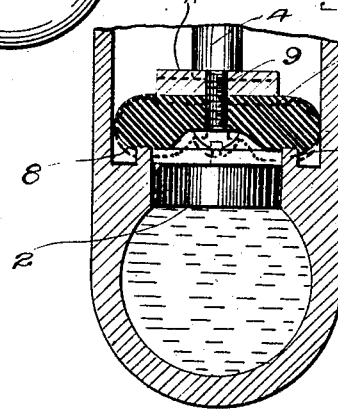
Witnesses
H. A. Stock.
H. C. Schroeder
Inventor
Claude Scheelk.
By E. E. Trooman,
Attorney.

UNITED STATES PATENT OFFICE.

CLAUDE SCHEELK, OF OAKLAND, CALIFORNIA.

VALVE-GASKET.

1,033,201.

Specification of Letters Patent. Patented July 23, 1912.

Application filed February 21, 1911. Serial No. 609,865.

*To all whom it may concern:*

Be it known that I, CLAUDE SCHEELK, a citizen of the United States, residing at Oakland, in the county of Alameda and State of California, have invented certain new and useful Improvements in Valve-Gaskets, of which the following is a specification.

This invention relates to water faucets and has special reference to the washer used for closing the valve seat of the faucet.

The invention has for its object to provide an improved washer for faucets, by means of which less pressure is required to effect the tight closure of the valve and at the same time the valve may be freely opened.

Referring to the accompanying drawing: Figure 1 is a side view of a water faucet partly in longitudinal section shown as equipped with a valve washer constructed in accordance with this invention. Fig. 2 is an enlarged detail plan view of the washer. Fig. 3 is an enlarged detail view of the washer in cross section showing its shape before it is pressed against the valve seat. Fig. 4 is an enlarged detail view of the faucet in cross section with the upper part removed showing the valve washer in position.

In the accompanying drawings, 1 indicates a water faucet having an outlet discharge valve seat 2 provided with an annular rim 3.

4 indicates the rotary screw stem of the valve and 5 the handle thereof. Mounted upon the lower end of the stem 4 is the valve washer 6 of rubber or other suitable flexible material and as here shown formed with a concaved under side 7 and the circular transversely curved portion 8 which is adapted to be seated on the vertical rim 3. The valve washer 6 is secured to the stem 4 in any suitable manner and as here shown by means of a screw 9 extending through a hole 10 in the center of the valve washer 6 and through a rectangular nut or washer 11 and into the lower end of the stem 4. By this means the washer 6 is clamped firmly against the nut 11 bearing against the lower end of the shaft 4.

It will be seen that when the handle 5 is turned thereby rotating the screw shaft 4, the valve washer 6 will be pressed against the rim 3 and owing to its concave shape on its under side and to its curved annular shape adjacent to its periphery will be forced down into the valve seat and over the rim 3 to the position shown in dotted lines in Fig. 4 from the position shown in full lines in Fig. 3. It will be seen that by means of this invention, the valve washer will be firmly seated to make a tight joint with a very slight pressure of the operating shaft. On account of the flexibility and contour of the valve washer, it seats itself more readily making it easier to shut off and open the faucet than by the usual construction and by means of the rounded edges on the valve washer, it is much easier to insert the valve attached to the stem into the faucet. Another advantage of the device is that considerable saving of material is effected. By reason of the shape and form of the washer herein described, it will last much longer than other washers.

Having described the invention, I claim:—

A water faucet having a valve seat with a vertical rim about its opening, a faucet shaft, a nut on the lower end of said shaft and a flexible valve washer bearing against said nut and formed with a concave underside and with a rounded bearing edge on the periphery, the thickest portion of said edge being adapted to seat on said vertical rim.

In testimony whereof I affix my signature in presence of two witnesses.

CLAUDE SCHEELK.

Witnesses:
H. C. SCHROEDER,
F. P. SCHROEDER.

Copies of this patent may be obtained for five cents each, by addressing the "Commissioner of Patents, Washington, D. C."